United States Patent [19]

Beck et al.

[11] Patent Number: 5,015,275
[45] Date of Patent: May 14, 1991

[54] ISOTROPIC MICROPOROUS SYNDIOTACTIC POLYSTYRENE MEMBRANES AND PROCESSES FOR PREPARING THE SAME

[75] Inventors: Henry N. Beck, Walnut Creek; Robert D. Mahoney, Danville; Hawk S. Wan; Richard A. Lundgard, both of Antioch, all of Calif.

[73] Assignee: The Dow Chemical Company, Midland, Mich.

[21] Appl. No.: 380,227

[22] Filed: Jul. 14, 1989

[51] Int. Cl.$^5$ .................... B01D 53/22; B01D 71/26
[52] U.S. Cl. ................................ 55/158; 210/500.34; 264/46.1
[58] Field of Search .............. 55/16, 158; 210/500.34; 264/46.1, 46.3

[56] References Cited

U.S. PATENT DOCUMENTS

| | | |
|---|---|---|
| 2,988,783 | 6/1961 | Miller et al. |
| 3,019,077 | 1/1962 | Carey et al. |
| 3,046,245 | 7/1962 | Kern et al. |
| 3,061,570 | 10/1962 | Kern et al. |
| 3,069,406 | 12/1962 | Newman et al. |
| 3,078,139 | 2/1963 | Brown et al. |
| 3,092,891 | 6/1963 | Baratti |
| 3,303,159 | 2/1967 | Saunders |
| 3,342,920 | 9/1967 | Fukushima et al. ............... 264/184 |
| 3,725,520 | 4/1973 | Suzuki et al. ........................ 264/41 |
| 3,837,146 | 9/1974 | Faure et al. ........................ 55/158 |
| 3,896,061 | 7/1975 | Tanzawa et al. ................ 264/49 X |
| 3,903,023 | 9/1975 | Boutillier et al. ............... 264/54 X |
| 4,086,310 | 4/1978 | Bottenbruch et al. .......... 55/158 X |
| 4,209,307 | 6/1980 | Leonard ............................ 55/158 X |
| 4,364,759 | 12/1982 | Brooks et al. ............. 210/500.34 X |
| 4,403,069 | 9/1983 | Keller et al. ...................... 264/23 X |
| 4,419,242 | 12/1983 | Cheng et al. .................... 55/158 X |
| 4,539,256 | 9/1985 | Shipman .......................... 428/315.5 |
| 4,595,707 | 6/1986 | McCreedy et al. ................... 521/62 |
| 4,664,681 | 5/1987 | Anazawa et al. ..................... 55/158 |
| 4,680,353 | 7/1987 | Ishihara et al. ..................... 526/160 |
| 4,729,773 | 3/1988 | Shirato et al. ....................... 55/158 |
| 4,813,983 | 3/1989 | Nohmi et al. ........................ 55/158 |

FOREIGN PATENT DOCUMENTS

| | | |
|---|---|---|
| 1102944 | 6/1981 | Canada . |
| 1182258 | 2/1985 | Canada ................... 210/500.34 |
| 55-14163 | 4/1980 | Japan . |

OTHER PUBLICATIONS

Aubert, J. H., *Polym. Prepr. (Am. Chem. Soc., Div. Polym. Chem.), 28(1), 147-8 (1987), CA 106(26): 214753d.*
Guenet, J. M., and McKenna, G. B., *J. Polymer Sci. Part B: Polym. Phys., 24(11), 2499-508 (1986), CA 106(4): 19320h.*
Guenet, J. M., *Macromolecules, 19(7), 1961-1968 (1986), CA 105(6): 43795s.*
Guenet, J. M., *Polym. Bull. (Berlin), 14(1), 105-8 (1985), CA 104(6): 34675e.*
Roots, J. Nystroem, B., and Higgins, J. S., *Polym. Commun., 26(8), 229-31 (1985), CA 103(22): 178942s.*
Guenet, J. M., Wittmann, J. C., and Lotz, B. *Macromolecules, 18(3), 420-7 (1985), CA 104(14): 114330n.*
Atkins, E. D. T., Hill, M. J., Jarvis, D. A., Keller, A., Sarhene, E., and Shapiro, J. S., *Colloid Polym. Sci., 262(1), 22-45 (1984), CA 100(12): 86470w.*
Sundararajan, P. R., Tyrer, N., and Bluhm, T., *Macromolecules, 15(2), 286-90 (1982), CA 96(18): 143604t.*
Sundararajan, P. R., Tyrer, N., and Bluhm, T., *Polym. Bull. (Berlin), 6(5-6), 285-9 (1982), CA 96(16): 123605r.*
Atkins, E. D. T., Keller, A., Shapiro, J. S., and Lemstra, P. J., *Polymer, 22(9), 1161-4(1981), CA 96(6): 35964b.*
Painter, P. C., Kessler, R. E., and Snyder, R. W., *J. Polym. Sci. Polym. Phys. Ed., 18(4), 723-9 (1980), CA 92(24): 198960d.*
Wellinghoff, S., Shaw, J., and Baer, E., *Macromolecules, 12(5), 932-9 (1979), CA 91(20): 158232r.*
Girolamo, M., Keller, A., Miyasaka, K., and Overbergh, N., *J. Polym. Sci., Polym. Phys. Ed., 14(1), 39-61 (1976), CA 84(16): 106220w.*
Lemstra, P. J., and Challa, G., *J. Polym. Sci. Polym. Phys. Ed., 13(9), 1809-1817 (1975), CA 83(24):193931z.*
Helms, J. B., and Challa, G., *J. Polym. Sci., Part A-2, 10(4), 761-5 (1972), CA 77(4): 20217u.*
Blais, P., and Manley, R. St. John, *J. Polym. Sci., Polym. Sci. Polym. Phys. Ed., 4(6), 1022-24 (1966), CA 66(14): 55876h.*

Primary Examiner—Robert Spitzer
Attorney, Agent, or Firm—Janet Pauline Clark; Noreen L. Date-Warrick

[57] ABSTRACT

This invention relates to semi-permeable isotropic syndiotactic polystyrene microporous membranes and processes for preparing such membranes.

21 Claims, No Drawings

ISOTROPIC MICROPOROUS SYNDIOTACTIC POLYSTYRENE MEMBRANES AND PROCESSES FOR PREPARING THE SAME

BACKGROUND OF THE INVENTION

This invention relates to isotropic mioroporous membranes comprised of syndiotactic polystyrene and processes for preparing such membranes.

Microporous membranes have long been used in the liquid membrane separation processes of ultrafiltration, microfiltration, membrane distillation, and membrane stripping. Ultrafiltration and microfiltration are pressure driven filtration processes using microporous membranes in which particles or solutes are separated from solutions based on differences in particle size, particle shape, and/or molecular weight. Membrane distillation and membrane stripping are separation processes using microporous membranes in which certain components of the liquid to be treated which are more volatile permeate through the membrane as vapor more rapidly than components which are less volatile due to differences in chemical potential across the membrane. In membrane distillation, the permeated components are condensed on the permeate side of the membrane and removed as liquid, while in membrane stripping the permeated components are removed from the permeate side of the membrane as vapor.

Such microporous membranes may be isotropic or anisotropic (asymmetric). Isotropic microporous membranes possess a morphology in which the pore size within the membrane is substantially uniform throughout the membrane. Anisotropic (asymmetric) microporous membranes possess a morphology in which a pore size gradient exists across the membrane: that is, the membrane morphology varies from highly porous, larger pores at one membrane surface to less porous, smaller pores at the other membrane surface. Such anisotropic membranes thus possess a microporous "skin" of smaller pores. The term asymmetric is often used interchangeably with the term anisotropic.

In the past, such microporous membranes have been fabricated from aliphatic polyolefins such as polyethylene and polypropylene, or from high performance polymers such as sulfonated polyetheretherketone.

However, the aliphatic polyolefin polymers presently used, while inexpensive and easy to process, exhibit relatively low heat distortion temperatures. The high performance polymers, such as sulfonated polyetheretherketone, are derived from polymers which are difficult to process and quite expensive.

What is needed are isotropic microporous membranes useful for ultrafiltration, microfiltration, membrane distillation, and/or membrane stripping which possess good solvent resistance and heat distortion temperatures, are easily processed, and are prepared from low-cost materials.

SUMMARY OF THE INVENTION

The invention is a semi-permeable membrane comprising a thin isotropic syndiotactic polystyrene microporous membrane.

In another aspect, the invention is a process for preparing a semi-permeable isotropic syndiotactic polystyrene microporous membrane comprising the steps of:
A. forming a mixture comprising:
  (i) syndiotactic polystyrene,
  (ii) at least one solvent for the syndiotactic polystyrene,
  (iii) optionally at least one non-solvent for the syndiotactic polystyrene:
B. heating the mixture to a temperature under conditions such that a homogeneous fluid is formed which possesses sufficient viscosity to be formed into a membrane:
C. extruding or casting the homogeneous fluid into a membrane:
D. quenching or coagulating the membrane by passing the membrane through one or more zones under conditions such that the membrane solidifies:
E. simultaneously or consecutively leaching the membrane by passing the membrane through one or more zones under conditions such that at least a substantial portion of the solvent and optional non-solvent for the syndiotactic polystyrene is removed from the membrane: and
F. optionally drawing the membrane before, during, and/or after leaching at a temperature at or above ambient temperature and below the melting point of the syndiotactic polystyrene or the depressed melting point of the polystyrene/solvent/optional non-solvent mixture to elongate the membrane and to induce orientation of the syndiotactic polystyrene in the membrane:

wherein the semi-permeable membrane so formed possesses isotropic microporous structure. The solvents used in said process may be protic or aprotic.

The semi-permeable membranes so formed are useful in ultrafiltration, microfiltration, membrane distillation, and/or membrane stripping, or as supports for composite gas or liquid separation membranes. The semi-permeable membranes of this invention possess good solvent resistance and heat distortion properties. The semi-permeable membranes may be prepared with relative ease and low cost.

DETAILED DESCRIPTION OF THE INVENTION

The membranes of this invention are prepared from syndiotactic polystyrene. Polystyrene is represented by the formula:

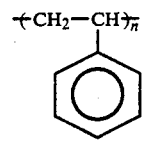

in which the phenyl group is pendant to the polymer backbone. Polystyrene may be isotactic, syndiotactic, or atactic, depending upon the positional relationship of the phenyl groups to the polymer backbone. Syndiotactic polystyrene is polystyrene wherein the phenyl groups which are pendent from the polymer backbone alternate with respect to which side of the polymer backbone the phenyl group is pendent. In other words, every other phenyl group is on the same side of the polymer backbone. Isotactic polystyrene has all of the phenyl groups on the same side of the polymer backbone. Standard polystyrene is referred to as atactic, meaning it has no stereoregularity; the placement of the phenyl groups with respect to each side of the polymer backbone is random, irregular, and follows no pattern. For further definition and description of stereoregular polymers, see Leo Mandelkern, *An Introduction to Macromolecules*, 2nd edition, Springer-Verlag, New York, N.Y., 1983, pp. 49–51, the relevant portions incorporated herein by reference.

The properties of polystyrene vary according to the tacticity of the polystyrene, that is, the positional relationship of the pendent phenyl groups to the polymer backbone. Atactic polystyrene is generally unsuitable for membrane formation because of its lack of crystallinity and poor solvent resistance. Isotactic polystyrene possesses improved solvent and temperature resistance over atactic polystyrene. However, isotactic polystyrene is somewhat slow to produce suitable gels from its solutions at ambient conditions necessary to form membranes. Isotactic polystyrene crystallizes very slowly to form crystalline species that melt at about 190–240° C.; nucleating agents often must be added to facilitate its crystallization. Syndiotactic polystyrene exhibits excellent heat distortion temperature properties. Syndiotactic polystyrene rapidly crystallizes to form crystalline species that melt at about 269–276° C; nucleating agents are generally not needed to facilitate its crystallization.

Syndiotactic polystyrene may be prepared by methods well known in the art. See Japanese Patent 104818 (1987); Ishihara et al., U.S. Pat. No.4,680,353; and Ishihara, *Macromolecules*, 19 (9), 2464 (1986); the relevant portions incorporated herein by reference. The term syndiotactic polystyrene includes polystyrene in which syndiotactic stereoregularity predominates. Syndiotactic polystyrene, as defined herein, preferably possesses a degree of syndiotactic tacticity of at least about 55 percent, more preferably of at least about 70 percent, even more preferably of at least about 80 percent. The percent tacticity of syndiotactic polystyrene may be determined from nuclear magnetic resonance spectra and X-ray diffraction patterns by methods known in the art. See "Stereoregular Linear Polymers" and "Stereoregular Styrene Polymers", *Encyclopedia of Polymer Science and Engineering*, Vol. 15, John Wiley & Sons, New York, N.Y., 1989, pp. 632–763 and "Nuclear Magnetic Resonance," *Encyclopedia of Polymer Science and Engineering*, Vol. 10, John Wiley & Sons, New York, N.Y., 1987, pp. 254–327; the relevant portions incorporated herein by reference. The syndiotactic polystyrene of this invention may optionally contain small amounts of inert compounds, inhibitors, stabilizers, or other additives which do not adversely affect the membrane-forming ability of the syndiotactic polystyrene/solvent/optional non-solvent mixture. Preferably the presence of these minor impurities in the syndiotactic polystyrene is less than about 10 weight percent, more preferably less than about 5 weight percent, most preferably less than about 1 weight percent.

The invention comprises a semi-permeable isotropic syndiotactic polystyrene microporous membrane and processes for preparing the same.

Solvents useful in this invention are those compounds which are a liquid at membrane fabrication temperatures and which dissolve a sufficient amount of the syndiotactic polystyrene to result in a solution viscous enough to form membranes. Solvents at the membrane fabrication temperature dissolve at least about 5 weight percent of the syndiotactic polystyrene, preferably at least about 10 weight percent, more preferably at least about 25 weight percent, even more preferably at least about 50 weight percent. The boiling points of the solvents useful in this invention are preferably above the membrane fabrication temperature so that a significant portion of the solvent is not flashed off during the extrusion or casting step but is instead retained in the membrane until the quenching/coagulating and/or leaching steps. The solvents preferably possess a boiling point of at least about 130° C., more preferably of at least about 140° C. The solvents useful in this invention may be protic or aprotic. A protic solvent as used herein refers to a solvent which is capable of dissolving the polystyrene, in which one of the steps of dissolution involves the generation of protons or hydrogen ions. An aprotic solvent as used herein refers to a solvent which is capable of dissolving the polystyrene, in which one of the steps of dissolution does not involve the generation of proton or hydrogen ions.

Preferred solvents for syndiotactic polystyrene include substituted benzenes of the formulas:

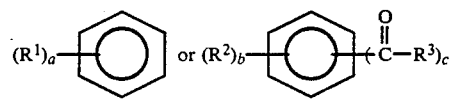

wherein
$R^1$ is hydrogen, alkyl, cycloalkyl, halo, or nitro:
$R^2$ is alkyl:
$R^3$ is alkyl, aryl, carboxyaryl, or alkoxy:
a is an integer of from 1 to 3;
b is an integer of from 0 to 3; and
c is an integer of from 1 to 2.

Other preferred solvents include alkyl, cycloalkyl, aryl, or aralkyl substituted pyrrolidinones; chloronaphthalenes: hydrogenated and partially hydrogenated naphthalenes; aryl substituted phenols; ethers of the formula:

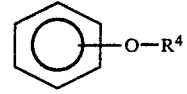

wherein $R^4$ is alkyl, cycloalkyl, or aryl, diphenyl sulfone; benzyl alcohol; bisphenol A; caprolactam; caprolactone; alkyl aliphatic esters containing a total of from 7 to 20 carbon atoms; alkyl aryl substituted formamides; dicyclohexyl; terphenyls; partially hydrogenated terphenyls; and mixtures of terphenyls and quaterphenyls.

Preferred substituted benzene solvents include o-dichlorobenzene, 1,2,3-trichlorobenzene, 1,2,4-trichlorobenzene, xylene, nitrobenzene, acetophenone, methyl benzoate, ethyl benzoate, diphenyl phthalate, benzil, methyl salicylate, benzophenone, cyclohexyl benzene, n-butylbenzene, n-propylbenzene, phenol, and dimethyl phthalate. Examples of preferred ethers include phenetole (phenyl ethyl ether), diphenyl ether, and anisole. Examples of preferred pyrrolidinone solvents include 1-benzyl-2-pyrrolidinone, 1-cyclohexyl-2-pyrrolidinone, 1-ethyl-2-pyrrolidinone, 1-methyl-2-pyrrolidinone, and 1-phenyl-2-pyrrolidinone. More preferred pyrrolidinone solvents include the alkyl and cycloalkyl substituted pyrrolidinones. Even more preferred pyrrolidinone solvents include 1-cyclohexyl-2-pyrrolidinone, 1-ethyl-2-pyrrolidinone, and 1-methyl-2-pyrrolidinone. Preferred ether solvents include anisole and diphenyl ether. Preferred hydrogenated naphthalene solvents include decahydronaphthalene (deoalin) and tetrahydronaphthalene (tetralin). Examples of terphenyls and partially hydrogenated terphenyls preferred include partially hydrogenated terphenyls, available from Monsanto under the tradename Therminol ® 66; mixed terphenyls and quaterphenyls, available from Monsanto under the tradename Therminol ® 75; and mixed terphenyls available from Monsanto under the Santowax ® R tradename. More preferred aliphatic esters are those methyl aliphatic esters with a total of from 10 to 14 carbon atoms, with methyl laurate being most preferred.

More preferred solvents include 1,2,3-trichlorobenzene, 1,2,4-trichlorobenzene, 1-ethyl-2-pyrrolidinone, 1-methyl-2-pyrrolidinone, 1-cyclohexyl-2pyrrolidinone, acetophenone, anisole, benzil, benzophenone, benzyl alcohol, bisphenol A, caprolactam, caprolactone, decahydronaphthalene, tetrahydronaphthalene, diphenyl ether, ethyl benzoate, methyl salicylate, dichlorobenzene, mixed terphenyls, and partially hydrogenated terphenyls.

Water miscible solvents are a preferred class of solvents which include 1-cyclohexyl-2-pyrrolidinone, 1-methyl-2-pyrrolidinone, caprolactam, caprolactone, N,N-diphenylformamide, and sulfolane.

Alkali miscible solvents are a preferred class of solvents which include alcohols and phenols.

Protic solvents preferred for use in this invention include 4-phenylphenol, benzyl alcohol, bisphenol A, caprolactam, phenetole, and phenol.

Aprotic solvents preferred for use in this invention include o-dichlorobenzene, 1,2,3-trichlorobenzene, 1,2,4-trichlorobenzene, xylene, nitrobenzene, acetophenone, methyl benzoate, ethyl benzoate, diphenyl phthalate, benzil, methyl salicylate, benzophenone, cyclohexyl benzene, n-butylbenzene, n-propylbenzene, anisole, 1-benzyl-2-pyrrolidinone, 1-cyclohexyl-2-pyrrolidinone, 1-ethyl-2-pyrrolidinone, 1-methyl-2-pyrrolidinone, 1-phenyl-2-pyrrolidinone, decahydronaphthalene (decalin), tetrahydronaphthalene (tetralin), methyl laurate, and caprolactone.

The solvents useful in this invention may optionally contain small amounts of inert compounds, inhibitors, stabilizers, or other additives which do not adversely affect the membrane-forming ability of the syndiotactic polystyrene/solvent/optional non-solvent mixture. Preferably the presence of these minor impurities in the solvent is less than about 10 weight percent, more preferably less than about 5 weight percent, most preferably less than about 1 weight percent.

The optional non-solvents useful in this invention are those compounds which are a liquid at membrane fabrication temperatures and which dissolve less than about 5 weight percent of the syndiotactic polystyrene at the membrane fabrication temperature. The boiling points of the non-solvents useful in this invention are preferably above the membrane fabrication temperature so that a significant portion of the non-solvent is not flashed off during the extrusion or casting step but is instead retained in the membrane until the quenching/coagulating and/or leaching steps. The non-solvents preferably possess a boiling point of at least about 100° C., more preferably of at least about 120° C.

Non-solvents preferred for use in this invention include dimethylsulfoxide, ethylene carbonate, methyl caproate, methyl caprylate, methyl enanthate, methyl valerate, mineral oil, and paraffin oil.

The non-solvents useful in this invention may optionally contain small amounts of inert compounds, inhibitors, stabilizers, or other additives which do not adversely affect the membrane-forming ability of the syndiotactic polystyrene/solvent/optional non-solvent mixture. Preferably, the presence of these minor impurities in the non-solvent is less than about 10 weight percent, more preferably less than about 5 weight percent, most preferably less than about 1 weight percent.

The concentration of syndiotactic polystyrene in the casting or extrusion mixture may vary. The concentration of the syndiotactic polystyrene in the mixture is dependent upon the solvent and optional non-solvent, the molecular weight of the syndiotactic polystyrene, and the viscosity of the mixture. The syndiotactic polystyrene molecular weight should be sufficient such that membranes with reasonable physical integrity can be formed. The weight-average molecular weight (Mw) of the syndiotactic polystyrene is preferably at least about 200,000 daltons, more preferably at least about 400,000 daltons. The preferred upper limit on the weight-average molecular weight is about 5,000,000 daltons, with about 3,000,000 daltons being more preferred. The mixture must possess sufficient viscosity to enable casting or extruding the mixture into a membrane. If the viscosity is too low, the membranes will lack physical integrity; if the viscosity is too high, the mixture cannot be formed into membranes. Preferably, the lower limit on viscosity at the membrane casting or extrusion step is about 20 poise, more preferably about 40 poise. The upper limit on viscosity at the membrane casting or extrusion step is preferably about 1,000,000 poise, more preferably about 500,000 poise, most preferably about 100,000 poise Preferably, the mixture contains between about 5 and about 90 weight percent syndiotactic polystyrene, more preferably between about 10 and about 80 weight percent syndiotactic polystyrene, even more preferably between about 15 and about 70 weight percent syndiotactic polystyrene. The amount of optional non-solvent used in the mixture is such that the solvent and non-solvent together dissolve at least about 5 weight percent of the syndiotactic polystyrene present at the membrane fabrication temperature, preferably at least about 10 weight percent, more preferably at least about 25 weight percent. Preferably the amount of optional non-solvent in the mixture is less than about 20 weight percent, more preferably less than about 15 weight percent.

The membranes of this invention may be prepared by solution casting or extrusion. In the solution casting process, the syndiotactic polystyrene is contacted with at least one solvent and optionally at least one non-solvent for the syndiotactic polystyrene at elevated temperatures. The elevated temperature at which the mixture is contacted is that temperature at which the mixture is a homogeneous fluid, and below that temperature at which the syndiotactic polystyrene degrades and below that temperature at which the solvent and optional non-solvent boils. The upper temperature limit is preferably below about 325° C., more preferably below about 300° C. The minimum temperature limit is preferably at least about 25° C. The contacting takes place with adequate mixing or agitation to ensure a homogeneous solution.

In the case of casting, a membrane may be cast into flat sheet form by pouring the mixture onto a smooth support surface and drawing down the mixture to an appropriate thickness with a suitable tool such as a doctor blade or casting bar. Alternately, the mixture may be cast in a continuous process by casting the mixture onto endless belts or rotating drums. The casting surface may be such that the membrane may thereafter be readily separated from the surface. For example, the membrane may be cast onto a support having a low surface energy, such as silicone, coated glass, Teflon, or metal, or a surface to which the membrane will not adhere. The mixture may also be cast onto the surface of a liquid with which the syndiotactic polystyrene is immiscible, such as water or mercury. Alternately, the mixture may be cast onto a support surface which may thereafter be dissolved away from the finished membrane. The membrane may also be cast onto a porous support surface. The cast membrane is thereafter subsequently quenched or coagulated, leached, and optionally drawn as described hereinafter for isotropic microporous membranes formed by the extrusion process.

Extrusion is the preferred process for the fabrication of flat sheet, tubular, or hollow fiber membranes. In the case of extrusion, the components of the extrusion mixture may be combined prior to extrusion by mixing in any convenient manner with conventional mixing equipment, as for example, in a Hobart mixer or a resin kettle. Alternately, the extrusion mixture may be homogenized by extruding the mixture through a twin screw extruder, cooling the extrudate, and grinding or pelletizing the extrudate to a particle size readily fed to a single or twin screw extruder. The components of the extrusion mixture may also be combined directly in a melt-pot or twin screw extruder and extruded into membranes in a single step.

The mixture of syndiotactic polystyrene/solvent/optional non-solvent is heated to a temperature at which the mixture becomes a homogeneous fluid. The homogeneous fluid is then extruded through a sheet, hollow tube, or hollow fiber die (spinnerette). Hollow fiber spinnerettes are typically multi-holed and thus produce a tow of multiple hollow fibers. The hollow fiber spinnerettes include a means for supplying fluid to the core of the extrudate. The core fluid is used to prevent collapse of the hollow fibers as they exit the spinnerette. The core fluid may be a gas such as nitrogen, air, carbon dioxide, or other inert gas, or a liquid with which the syndiotactic polystyrene is substantially immiscible, such as water.

Following casting or extruding, the membrane is passed through at least one quench or coagulation zone under conditions such that the membrane solidifies. The environment of the quench or coagulation zone may be a gas, a liquid, or a combination thereof. Within the quench or coagulation zone, the membrane is subjected to cooling and/or coagulation to cause gelation and solidification of the membrane. In one preferred embodiment, the membranes are first quenched in a gas, preferably air. Within the gas quench zone, the membranes gel and solidify. A portion of the solvent and optional non-solvent may evaporate and the membrane pore structure may begin to form. The temperature of the gas quench zone is such that the membrane gels and solidifies at a reasonable rate. The temperature of the gas quench zone is preferably at least about 0° C., more preferably at least about 15° C. The temperature of the gas quench zone is preferably less than about 100° C., more preferably less than about 50° C. Ambient temperatures are particularly convenient and suitable for the gas quench zone. Shrouds may be used to help control gas flow rates and temperatures in the gas quench zone. The residence time in the gas quench zone is such that the membrane gels and solidifies. The residence time in the gas quench zone is preferably at least about 0.01 seconds, more preferably at least about 0.05 seconds. The residence time in the gas quench zone is preferably less than about 10 seconds, more preferably less than about 8 seconds.

Following or instead of the gas quench, the membranes may be quenched or coagulated in a liquid which does not dissolve the syndiotactic polystyrene. The primary function of the quench or coagulation liquid may be to provide a sufficient heat transfer media to solidify the membrane. However, the quench or coagulation liquid may optionally also be a solvent for the syndiotactic polystyrene solvent and optional non-solvent so as to enable removal of at least a portion of the syndiotactic polystyrene solvent and optional non-solvent from the membrane during the quenching and/or coagulation step. Preferred liquid quench or coagulation zone materials include water, lower alcohols, phenols, halogenated hydrocarbons, and perhalogenated carbon compounds. Perhalogenated carbon compounds are materials with a carbon backbone wherein all of the hydrogen atoms have been replaced by halogen atoms. More preferred liquid quench or coagulation materials include water, chlorinated hydrocarbons, and lower alcohols, with lower alcohols being most preferred. Preferred lower alcohols are $C_{1-4}$ alcohols. The lower temperature limit on the liquid quench or coagulation zone is that temperature at which the liquid quench material freezes. The lower temperature limit on the liquid quench or coagulation zone is preferably at least about 0° C. The upper temperature limit on the liquid quench or coagulation zone is either the boiling points of the syndiotactic polystyrene solvent and optional non-solvent or that temperature above which the membrane does not undergo solidification when in contact with the liquid quench or coagulation material, whichever is lower. The upper temperature limit on the liquid quench or coagulation zone is preferably less than about 100° C., more preferably less than about 50° C. Ambient temperatures are suitable and convenient. The residence time in the liquid quench or coagulation zone is such that the membrane gels and solidifies. The residence time in the liquid quench or coagulation zone is preferably at least about 0.01 seconds, more preferably at least about 0.05 seconds. The residence time in the liquid quench zone is preferably less than about 200 seconds, more preferably less than about 100 seconds.

Following quenching and or coagulation, the membrane is passed through at least one leach zone under conditions such that at least a substantial portion of the solvent and optional non-solvent for the syndiotactic polystyrene is removed from the membrane. The leach zone material is a solvent for the syndiotactic polystyrene solvent and optional non-solvent but does not dissolve the syndiotactic polystyrene. The materials which may be used in the leach zone are the same as the materials which may be used in the liquid quench or coagulation zone. The minimum temperature of the leach zone is that temperature at which the syndiotactic polystyrene solvent and optional non-solvent are removed from the membrane at a reasonable rate. The minimum temperature of the leach zone is preferably at least about 0° C., more preferably at least about 15° C. The maximum temperature of the leach zone is below that temperature at which membrane integrity is adversely affected. The maximum temperature of the leach zone is preferably less than about 150° C., more preferably less than about 100° C. The residence time in the leach zone is that which is sufficient to remove at least a portion of the syndiotactic polystyrene solvent and optional non-solvent from the membrane. Preferably, a substantial portion of the remaining syndiotactic polystyrene solvent and optional non-solvent is removed from the membrane in the leach zone. The residence time in the leach zone is preferably between about 1 second and about 24 hours, more preferably between about 30 seconds and about 8 hours. The leach step may be performed as a continuous or batch process. The residence time is dependent upon the particular solvent and optional non-solvent, the membrane size and thickness, and the kinetics for removing the solvent and optional non-solvent from the membrane.

Before, during, and/or after leaching, the membranes may be drawn down or elongated to the appropriate size and thickness. Drawing down or elongating means the membranes are stretched such that the length of the membrane is longer and the diameter is smaller at the end of the drawing or elongation process. Drawing increases the mechanical strength of the membrane by inducing orientation in the membrane. The draw temperature is dependent upon whether the membrane contains solvent and optional non-solvent at the time of drawing. For substantially solvent and optional non-solvent free membranes, the membrane is heated to a temperature between the glass transition temperature of syndiotactic polystyrene and the melting point of syndiotactic polystyrene, with preferred lower temperatures being at least about 90° C., more preferably at least about 100° C., and with preferred upper temperatures being less than about 280° C., more preferably less than about 270° C. For membranes containing solvent and optional non-solvent, the membrane is heated to a temperature between ambient temperature and the melting point of syndiotactic polystyrene or the depressed melting point of the polystyrene/solvent/optional non-solvent mixture, with preferred lower temperatures being at least about 10° C., more preferably at least about 25° C., and preferred upper temperatures being less than about 10° C. below the depressed melting point. The membrane is drawn by stretching the membrane under tension. Flat sheet membranes may be uniaxially or biaxially drawn, while hollow fiber membranes are uniaxially drawn. This is generally performed by running the membranes over a pair of godets in which the latter godets are moving at a faster rate than the former godets. The draw down or elongation ratio is the ratio of the beginning length of the membrane to the final length of the membrane. Preferably the lower limit on the draw down or elongation ratio is about 1.05, more preferably 1.1. Preferably the upper limit on the draw down or elongation ratio is about 10. The membrane may be drawn in one or more stages with the options of using different temperatures, draw rates, and draw ratios in each stage. Line speeds are generally not critical and may vary significantly. Practical minimum preferred line speeds are at least about 10 feet/minute, more preferably at least about 30 feet/minute. Practical maximum preferred line speeds are less than about 2000 feet/minute, more preferably less than about 1000 feet/minute.

Optionally before or after leaching and/or drawing, the membranes may be annealed by exposing the membranes to elevated temperatures. The membranes may be annealed at temperatures above the glass transition temperature (Tg) of the syndiotactic polystyrene or syndiotactic polystyrene/solvent/optional non-solvent mixture and about 10° C. below the melting point of the syndiotactic polystyrene or depressed melting point of the syndiotactic polystyrene/solvent/non-solvent mixture for a period of time between about 30 seconds and about 24 hours.

The transport rate through the membrane for an isotropic membrane is inversely proportional to the membrane thickness. The thickness of the membrane is such that the membrane possesses adequate mechanical strength under use conditions and good separation characteristics. In the case of flat sheet membranes, the minimum thickness is preferably at least about 10 microns, more preferably at least about 15 microns; the maximum thickness is preferably less than about 500 microns, more preferably less than about 400 microns. In the case of hollow fibers, the outer diameter of the membrane is preferably at least about 50 microns, more preferably at least about 70 microns; the outer diameter of the membrane is preferably less than about 5000 microns, more preferably less than about 4000 microns. The inside diameter of the hollow fiber membranes is preferably at least about 30 microns, more preferably at least about 40 microns; the inside diameter of the hollow fiber membranes is preferably less than about 4980 microns, more preferably less than about 3980 microns. The hollow fiber membrane thickness is preferably at least about 10 microns, more preferably at least about 15 microns; the membrane thickness is preferably less than about 500 microns, more preferably less than about 400 microns.

The final solvent and optional non-solvent free membranes preferably exhibit a glass transition temperature of at least about 80° C., more preferably of at least about 90° C., most preferably of at least about 100° C.

The membranes are fabricated into flat sheet, spiral, tubular, or hollow fiber devices by methods described in the art. Spiral wound, tubular, and hollow fiber devices are preferred. Tubesheets may be affixed to the membranes by techniques known in the art. The membrane is sealingly mounted in a pressure vessel in such a manner that the membrane separates the vessel into two fluid regions wherein fluid flow between the two regions is accomplished by fluid permeating through the membrane. Conventional membrane devices and fabrication procedures are well known in the art.

The membranes are useful in ultrafiltration, microfiltration, membrane distillation, and/or membrane stripping, and as supports for composite gas or liquid separation membranes.

In ultrafiltration or microfiltration, the membranes are used to recover or isolate solutes or particles from solutions. The membrane divides the separation chamber into two regions, a higher pressure side into which the feed solution is introduced and a lower pressure side. One side of the membrane is contacted with the feed solution under pressure, while a pressure differential is maintained across the membrane. To be useful, at least one of the particles or solutes of the solution is selectively retained on the high pressure side of the membrane while the remainder of the solution selectively passes through the membrane. Thus the membrane selectively "rejects" at least one of the particles or solutes in the solution, resulting in a retentate stream being withdrawn from the high pressure side of the membrane which is enriched or concentrated in the selectively rejected particle(s) or solute(s) and a filtrate stream being withdrawn from the low pressure side of the membrane which is depleted in the selectively rejected particle(s) or solute(s).

In membrane distillation or membrane stripping, the membranes are used to remove or recover more volatile components and less volatile components. For example, membrane distillation and membrane stripping are useful for desalinating water and/or removing volatile organics from aqueous streams. The membrane divides the separation chamber into two regions. The feed stream containing more volatile and less volatile components is contacted with the non-permeate side of the membrane, while contacting the permeate side of the membrane with a sweep gas such as nitrogen, carbon dioxide, air, or other inert gas, a vacuum, or a combination thereof, under conditions such that the more volatile components permeate through the membrane as a vapor. A chemical potential gradient is thus established across the membrane due to the difference in vapor pressure of the more volatile components across the membrane. When a sweep gas is used, in some embodiments it may be advantageous to maintain the pressure on the permeate side of the membrane at a pressure greater than the pressure on the non-permeate side of the membrane in order to prevent leakage of liquid from the non-permeate side of the membrane through defects in the membrane to the permeate side of the membrane. In membrane stripping, the more volatile components which permeate through the membrane as vapor are removed from the permeate side of the membrane as vapor; in membrane distillation, the more volatile components which permeate through the membrane as vapor are condensed on the permeate side of the membrane and removed as liquid.

The separation processes described hereinbefore should be carried out at pressures which do not adversely affect the membrane, that is, pressures which do not cause the membrane to mechanically fail. The pressure differential across the membrane is dependent upon the membrane characteristics, including pore size, porosity, the thickness of the membrane, and in the case of hollow fiber membranes, the inside diameter. For the membranes of this invention, the pressure differential across the membrane is preferably between about 5 and about 500 psig, more preferably between about 10 and about 300 psig. The separation processes described hereinbefore should be carried out at temperatures which do not adversely affect membrane integrity. Under continuous operation, the operating temperature is preferably between about 0 and about 150° C., more preferably between about 15 and about 130° C.

The isotropic microporous membranes of this invention may be characterized in a variety of ways, including porosity, mean pore size, maximum pore size, bubble point, gas flux, water flux, and molecular weight cut off. Such techniques are well known in the art for characterizing microporous membranes. See Robert Kesting, *Synthetic Polymer Membranes*, 2nd edition, John Wiley & Sons, New York, N.Y., 1985, pp. 43–64; Channing R. Robertson (Stanford University), *Molecular and Macromolecular Sieving by Asymmetric Ultrafiltration Membranes*, OWRT Report, NTIS No. PB85-1577661EAR, September 1984; and ASTM Test Methods F316-86 and F317-72 (1982); the relevant portions incorporated herein by reference.

Porosity refers to the volumetric void volume of the membrane. Porosity may be determined gravimetrically from the density of the void-free polymer or from the differences between the wet and dry weights of the membrane. The membranes of this invention preferably have a porosity of at least about 5 percent, more preferably at least about 10 percent; the membranes of this invention preferably have a porosity of less than about 90 percent, more preferably of less than about 80 percent.

Pore size of the membrane may be estimated by several techniques including scanning electron microscopy, and/or measurements of bubble point, gas flux, water flux, and molecular weight cut off. The pore size of any given membrane is distributed over a range of pore sizes, which may be narrow or broad.

The bubble point pressure of a membrane is measured by mounting the membrane in a pressure cell with liquid in the pores of the membrane. The pressure of the cell is gradually increased until air bubbles permeate the membrane. Because larger pores become permeable at lower pressures, the first appearance of bubbles is indicative of the maximum pore size of the membrane. If the number of pores which are permeable to air increases substantially with a small increase in pressure, a narrow pore size distribution is indicated. If the number of air-permeable pores increases gradually with increasing pressure, a broad pore size distribution is indicated. The relationship between pore size and bubble point pressure can be calculated from the equation;

$$r = \frac{2G}{P}$$

where
r is the pore radius
G is the surface tension (water/air), and
P is the pressure.
See ASTM F316-86, the relevant portions incorporated herein by reference.

The membranes of this invention useful for ultrafiltration preferably possess a maximum pore size which exhibits a bubble point with denatured alcohol in the range of about 90–100 psig or greater, more preferably in the range of about 180–190 psig or greater.

The mean pore size of the membranes of this invention useful for ultrafiltration is preferably between about 5 and about 1000 Angstroms, more preferably between about 10 and about 500 Angstroms; the maximum pore size of such membranes is preferably less than about 1000 Angstroms, more preferably less than about 800 Angstroms. The mean pore size of the membranes of this invention useful for microfiltration, membrane distillation, and/or membrane stripping is preferably between about 0.02 and about 10 microns, more preferably between about 0.05 and about 5 microns; the maximum pore size of such membranes is preferably less than about 10 microns, more preferably less than about 8 microns.

Gas flux is defined as $$F = \frac{\text{(amount of gas passing through the membrane)}}{\text{(membrane area) (time) (driving force across the membrane)}}$$

A standard gas flux unit is $$\frac{(\text{centimeter})^3 \ (STP)}{(\text{centimeter})^2 \ (\text{second}) \ (\text{centimeter Hg})},$$

abbreviated hereinafter as $$\frac{cm^3 \ (STP)}{cm^2 \ sec \ cm \ Hg}$$

where STP stands for standard temperature and pressure. The membranes of this invention preferably have a gas flux for nitrogen of at least about $$1 \times 10^{-6} \frac{cm^3 \ (STP)}{cm^2 \ sec \ cm \ Hg},$$

more preferably of at least about $$1 \times 10^{-4} \frac{cm^3 \ (STP)}{cm^2 \ sec \ cm \ Hg}.$$

Water flux is defined as $$W = \frac{(amount \ of \ water \ passing \ through \ the \ membrane)}{(membrane \ area) \ (time)}$$

under given conditions of temperature and pressure. The water flux is commonly expressed in gallons per square foot of membrane area per day (GFD). The membranes of this invention preferably exhibit a water flux at about 50 psig and about 25° C. of at least about 1 GFD, more preferably of at least about 10 GFD. See ASTM 317-72 (1982), the relevant portions incorporated herein by reference.

SPECIFIC EMBODIMENTS

The following Examples are included for illustrative purposes only and are not intended to limit the scope of the invention or Claims. All percentages are by weight unless otherwise indicated.

EXAMPLE 1 Solubility Of Syndiotactic Polystyrene In Various Compounds

Mixtures consisting of approximately five weight percent polymer in various organic compounds are prepared in two dram-capacity glass vials that are subsequently sealed with aluminum foil liners. The mixtures are weighed to a precision of one milligram. The vials are placed in an air-circulating oven at about 125 - 140° C. Dissolution behavior is observed by transmitted light at close range from an AO universal microscope illuminator at progressively increasing temperatures until complete dissolution is observed, until the boiling point of the solvent is closely approached, or until 300° C. is reached (the approximate ceiling temperature of the syndiotactic polystyrene). The temperature is increased in about 25° C. increments. The mixtures are allowed to remain at a given temperature for at least about 30 minutes before the temperature is increased further. The hot mixtures are cooled to room temperature; their appearance is noted after they are allowed to stand undisturbed overnight at room temperature. The results are compiled in Table 1. The polymer noted as "SYNDIO2" is a sample of syndiotactic polystyrene with a weight-average molecular weight of about $5.6 \times 10^5$ daltons. The polymer noted as "SYNDIO" is a sample of syndiotactic polystyrene with a lower molecular weight.

TABLE I

| POLYMER | CONC. WGT. % | SOLVENT | APPROX. B.P., DEG. C. | TEMP. DEG. C. | SOLUBILITY | APPEARANCE AT ROOM TEMP |
|---|---|---|---|---|---|---|
| SYNDIO | 4.86 | 1-chloronaphthalene | 250 | 211 | Soluble | Firm hazy gel |
| SYNDIO | 5.08 | 1-cyclohexyl-2-pyrrolidinone | 301 | 200 | Soluble | Amber soft gel |
| SYNDIO | 4.95 | 1-phenyl-2-pyrrolidinone | 345 | 200 | Soluble | Opaque hard solid |
| SYNDIO | 4.97 | 4-phenylphenol | 321 | 211 | Soluble | Opaque hard solid |
| SYNDIO | 25.12 | 4-phenylphenol | 321 | 221 | Soluble | Opaque solid |
| SYNDIO | 5.16 | benzil | 347 | 211 | Soluble | Yellow hard solid |
| SYNDIO | 5.02 | benzophenone | 305 | 200 | Soluble | Clear firm gel |
| SYNDIO | 4.70 | caprolactam (epsilon) | 271 | 211 | Soluble | Opaque hard solid |
| SYNDIO | 24.94 | caprolactam (epsilon) | 271 | 221 | Soluble | Opaque hard solid |
| SYNDIO | 5.29 | diphenyl ether | 259 | 211 | Soluble | Firm hazy gel |
| SYNDIO | 5.35 | diphenyl sulfone | 379 | 231 | Soluble | Opaque hard solid |
| SYNDIO | 5.08 | N,N-diphenylformamide | 337 | 200 | Soluble | Opaque hard solid |
| SYNDIO | 5.21 | o-dichlorobenzene | 180 | 171 | Soluble | Firm hazy gel |
| SYNDIO | 4.77 | sulfolane | 285 | 217 | Not soluble | |
| SYNDIO | 4.77 | sulfolane | 285 | 231 | Soluble | Liquid slush |
| SYNDIO2 | 5.09 | 1,2,3-trichlorobenzene | 218 | 150 | Soluble | White opaque hard solid |
| SYNDIO | 4.72 | 1,2,4-trichlorobenzene | 214 | 211 | Soluble | Cloudy Soft gel |
| SYNDIO | 5.19 | 1-benzyl-2-pyrrolidinone | 420 | 211 | Soluble | Amber clear firm gel |
| SYNDIO2 | 5.14 | 1,2,4-trichlorobenzene | 214 | 136 | Soluble | Cloudy stiff gel |
| SYNDIO2 | 5.58 | 1-benzyl-2-pyrrolidinone | 420 | 224 | Soluble | Amber hazy stiff gel |
| SYNDIO2 | 5.58 | 1-benzyl-2-pyrrolidinone | 420 | 200 | Partly soluble | |
| SYNDIO2 | 5.26 | 1-chloronaphthalene | 258 | 136 | Soluble | Hazy stiff gel |
| SYNDIO2 | 5.16 | 1-cyclohexyl-2-pyrrolidinone | 301 | 136 | Partly soluble | |
| SYNDIO2 | 5.16 | 1-cyclohexyl-2-pyrrolidinone | 301 | 150 | Soluble | Amber soft hazy gel |
| SYNDIO2 | 5.13 | 1-ethyl-2-pyrrolidinone | 296 | 161 | Soluble | Pale yellow opaque slush |
| SYNDIO2 | 5.15 | 1-methyl-2-pyrrolidinone | 202 | 136 | Soluble | Cloudy stiff gel |
| SYNDIO2 | 5.04 | 1-phenyl-2-pyrrolidinone | 345 | 200 | Soluble | Tan opaque hard solid |
| SYNDIO2 | 5.09 | 4-phenylphenol | 321 | 225 | Soluble | White opaque hard solid |
| SYNDIO2 | 5.09 | 4-phenylphenol | 321 | 200 | Almost soluble | |
| SYNDIO2 | 5.13 | acetophenone | 202 | 165 | Soluble | Cloudy gel above solid |
| SYNDIO2 | 5.13 | acetophenone | 202 | 150 | Almost soluble | |
| SYNDIO2 | 5.01 | anisole | 154 | 153 | Soluble | Cloudy stiff gel |
| SYNDIO2 | 5.04 | benzil | 347 | 200 | Soluble | Yellow opaque hard solid |
| SYNDIO2 | 5.04 | benzil | 347 | 150 | Partially soluble | |
| SYNDIO2 | 5.05 | benzophenone | 305 | 188 | Soluble | Clear stiff gel |
| SYNDIO2 | 5.05 | benzophenone | 305 | 165 | Partly soluble | |
| SYNDIO2 | 5.67 | benzyl alcohol | 205 | 190 | Almost soluble | |

TABLE I-continued

| POLYMER | CONC. WGT. % | SOLVENT | APPROX. B.P., DEG. C. | TEMP. DEG. C. | SOLUBILITY | APPEARANCE AT ROOM TEMP |
|---|---|---|---|---|---|---|
| SYNDIO2 | 5.67 | benzyl alcohol | 205 | 204 | Soluble | White opaque soft gel |
| SYNDIO2 | 5.12 | butyl stearate | 343 | 273 | Soluble | White opaque fluid |
| SYNDIO2 | 5.12 | butyl stearate | 343 | 250 | Partly soluble | |
| SYNDIO2 | 5.09 | caprolactam (epsilon) | 271 | 200 | Soluble | Hard solid |
| SYNDIO2 | 5.10 | cyclohexanone | 155 | 150 | Soluble | soft gel |
| SYNDIO2 | 5.20 | decahydronaphthalene (decalin) | 190 | 188 | Almost soluble | Moderately stiff slush |
| SYNDIO2 | 5.18 | dimethyl phthalate | 282 | 200 | Partly soluble | |
| SYNDIO2 | 5.18 | dimethyl phthalate | 282 | 224 | Soluble | White opaque slush |
| SYNDIO2 | 5.02 | diphenyl ether | 259 | 150 | Soluble | Clear stiff gel |
| SYNDIO2 | 5.02 | diphenyl ether | 259 | 136 | Partly soluble | |
| SYNDIO2 | 5.28 | diphenyl sulfone | 379 | 225 | Soluble | Pale tan hard solid |
| SYNDIO2 | 5.19 | ethyl benzoate | 212 | 165 | Almost soluble | |
| SYNDIO2 | 5.19 | ethyl benzoate | 212 | 188 | Soluble | Stiff pale yellow hazy gel |
| SYNDIO2 | 5.34 | HB-40 (Monsanto) | 325 | 151 | Partly soluble | |
| SYNDIO2 | 5.34 | HB-40 (Monsanto) | 325 | 200 | Soluble | Slightly hazy pale yellow firm gel |
| SYNDIO2 | 5.13 | Mesitylene (1,3,5-trimethyl benzene) | 163 | 161 | Almost soluble | Stiff heterogeneous gel |
| SYNDIO2 | 4.97 | methyl benzoate | 199 | 150 | Soluble | Cloudy stiff gel |
| SYNDIO2 | 5.04 | methyl laurate | 262 | 250 | Soluble | White opaque slush |
| SYNDIO2 | 5.04 | methyl laurate | 262 | 224 | Almost soluble | |
| SYNDIO2 | 4.96 | methyl myristate | 323 | 241 | Hazy & soluble?? | |
| SYNDIO2 | 4.96 | methyl myristate | 323 | 255 | Soluble | Opaque white slush |
| SYNDIO2 | 5.07 | methyl salicylate | 222 | 175 | Soluble | Cloudy stiff gel |
| SYNDIO2 | 5.07 | methyl salicylate | 222 | 150 | Not soluble | |
| SYNDIO2 | 5.06 | methyl stearate | 359 | 273 | Soluble | Opaque solid |
| SYNDIO2 | 5.06 | methyl stearate | 359 | 250 | Partly soluble | |
| SYNDIO2 | 5.13 | nitrobenzene | 211 | 151 | Soluble | Yellow cloudy firm gel |
| SYNDIO2 | 4.82 | N,N-dimethylacetamide | 165 | 165 | Not soluble | white slush |
| SYNDIO2 | 5.04 | N,N-diphenylformamide | 337 | 225 | Soluble | Brown hard solid |
| SYNDIO2 | 5.04 | N,N-diphenylformamide | 337 | 200 | Almost soluble | |
| SYNDIO2 | 5.13 | o-dichlorobenzene | 180 | 150 | Soluble | Cloudy stiff gel |
| SYNDIO2 | 5.13 | 9-dichlorobenzene | 180 | 136 | Partly soluble | |
| SYNDIO2 | 5.00 | Santowax R (Monsanto) | 364 | 166 | Partially soluble | |
| SYNDIO2 | 5.00 | Santowax R (Monsanto) | 364 | 200 | Soluble | Tan hard solid |
| SYNDIO2 | 5.00 | sulfolane | 285 | 200 | Not soluble | |
| SYNDIO2 | 5.00 | sulfolane | 285 | 249 | Soluble | Light tan opaque firm gel |
| SYNDIO2 | 5.00 | sulfolane | 285 | 225 | Partially soluble | |
| SYNDIO2 | 5.27 | tetrahydronaphthalene (tetralin) | 207 | 136 | Soluble | Stiff hazy gel |
| SYNDIO2 | 5.15 | Therminol 66 (Monsanto) | 340 | 200 | Soluble | Slightly hazy pale yellow soft gel |
| SYNDIO2 | 5.15 | Therminol 66 (Monsanto) | 340 | 151 | Partly soluble | |
| SYNDIO2 | 4.99 | Therminol 75 (Monsanto) | 385 | 200 | Soluble | Yellow opaque firm solid/gel |
| SYNDIO2 | 5.25 | xylene | 141 | 136 | Soluble | Moderately stiff white opaque gel |
| SYNDIO2 | 4.98 | cyclohexylbenzene | 239 | 181 | Soluble | Cloudy firm gel |
| SYNDIO2 | 4.98 | cyclohexylbenzene | 239 | 158 | Almost Soluble | |
| SYNDIO2 | 4.99 | dicyclohexyl | 227 | 200 | Mostly soluble | |
| SYNDIO2 | 4.99 | dicyclohexyl | 227 | 225 | Soluble | Homogeneous slush |
| SYNDIO2 | 4.98 | methyl caproate | 151 | 151 | Not soluble | Clear liquid with solid polymer sediment |
| SYNDIO2 | 5.01 | methyl caproate | 194 | 194 | Not soluble | Milky liquid with solid sediment |
| SYNDIO2 | 4.94 | methyl enanthate | 172 | 172 | Not soluble | Water-clear liquid with polymer sediment |
| SYNDIO2 | 4.99 | Methyl valerate | 128 | 128 | Not soluble | Water-clear liquid with solid sediment |
| SYNDIO2 | 4.96 | n-butylbenzene | 182 | 183 | Mostly soluble | White opaque soft gel |
| SYNDIO2 | 4.96 | n-butylbenzene | 182 | 169 | Heavily swollen | |
| SYNDIO2 | 4.96 | n-butylbenzene | 182 | 151 | Not soluble | |
| SYNDIO2 | 5.00 | n-propylbenzene | 159 | 158 | Soluble | White opaque firm gel |
| SYNDIO2 | 5.04 | phenetole | 169 | 128 | Swollen | |
| SYNDIO2 | 5.04 | phenetole | 169 | 150 | Soluble | Hazy pink firm gel |
| SYNDIO2 | 5.35 | phenol | 182 | 155 | Swollen | |
| SYNDIO2 | 5.35 | phenol | 182 | 158 | Almost soluble | |
| SYNDIO2 | 5.35 | phenol | 182 | 181 | Soluble | Opaque white firm gel |

EXAMPLE 2 Syndiotactic Polystyrene Hollow Fiber Membranes Prepared Without Drawing From A Protic Solvent Hollow fibers are prepared from an extrusion blend containing about 35 percent syndiotactic polystyrene (Mw of about 450,000 daltons) and about 65 percent caprolactam by weight. The blend is mixed while heating to about 270° C. homogenize the blend and the blend is then transferred to a Ram extruder. Hollow fibers are extruded at about 235-240° C. using a single hole spinnerette and nitrogen as the core gas. The fibers are taken up on a chilled godet roll at a rate of about 30 feet/minute. The fibers as extruded have an internal diameter of about 539 microns and a wall thickness of about 61 microns.

Samples of the fibers are leached in water at ambient temperature and about 80° C. respectively for about 2½ hours to remove the caprolactam. The fibers are vacuum dried at about 50° C. and fabricated into test cells for the evaluation of gas flux. The fibers leached at ambient temperature possess an internal diameter of about 397 microns and a wall thickness of about 46 microns. The fibers leached at about 80° C. possess an internal diameter of about 366 microns and a wall thickness of about 52 microns.

The fibers are internally pressurized with nitrogen at room temperature and about 15 psig and the rate of permeating nitrogen measured. Fibers leached in water at ambient temperature possess a nitrogen flux of of about $0.051 \times 10^{-6}$ cm$^3$(STP)/(cm$^2$ sec cmHg) and fibers leached in water at about 80° C. possess a nitrogen flux of about $2 \times 10^{-6}$ cm$^3$ (STP)/(cm$^2$ sec cmHg).

EXAMPLE 3 Syndiotactic Polystyrene Hollow Fiber Membranes Prepared With Drawing Before Leach From A Protic Solvent Hollow fibers are extruded as described in Example 2. The fibers have an internal diameter of about 569 microns and a wall thickness of about 48 microns as extruded.

The fibers, which still contain caprolactam, are placed in an air oven at about 80° C. for about 3 minutes, and then drawn about 100%. After drawing, the fibers are restrained at their drawn length, cooled, and then fabricated into test cells. The inside and the outside of the potted fibers are flushed with running water for about 5 minutes to remove the caprolaotam. The final drawn fibers possess an internal diameter of about 339 microns and a wall thickness of about 35 microns.

The fibers are dried in a vacuum oven prior to testing for gas flux. The fibers possess a nitrogen flux of about $1.1 \times 10^{-3}$ cm$^3$(STP)/cm$^2$ sec cmHg).

The pores of the fibers are wetted with ethanol and the ethanol then replaced with water. The fibers possess a water flux of about 6 ml/(hr m$^2$ cmHg).

Bubble point testing indicates that the pores of the membrane are smaller than about 0.2 microns.

EXAMPLE 4 Syndiotactic Polystyrene Hollow Fiber Membranes Prepared With Drawing During Leach From A Protic Solvent The fibers as extruded are the same as described in Example 3.

The fibers are leached in a first glycerine bath at ambient temperature for about 1 hour and then transferred to a second glycerine bath at about 130° C. The fibers are immediately drawn about 100% of their original length. After cooling, the fibers are fabricated into test cells.

The outside of the fibers are washed with ethanol for about 25 minutes to remove the caprolactam and glycerol. The fibers are then dried. The fibers have an internal diameter of about 356 microns and a wall thickness of about 32 microns. The fibers possess a nitrogen flux of about $0.2 \times 10^{-3}$ cm$^3$(STP)/cm$^2$ sec cmHg).

The pores of the fibers are wet with ethanol and the ethanol then replaced with water. The fibers possess a water flux of about 4.8 ml/(hr m$^2$ cmHg).

Bubble point testing indicates that the pores of the membrane are smaller then about 0.25 microns.

EXAMPLE 5 Syndiotactic Polystyrene Hollow Fiber Membranes Prepared With Drawing After Leach From A Protic Solvent The fibers as extruded are the same as described in Example 3.

The fibers are leached in water at ambient temperature for about 2 hours. The fibers are then vacuum dried at ambient temperature for about 2 hours.

The fibers are placed in a glycerine bath at about 130° C. and drawn to about 100% of their original length after a residence time in the bath of about 1 sec. The fibers are then washed with water to remove any remaining glycerol. The drawn fibers have an internal diameter of about 327 microns and a wall thickness of about 29 microns.

The fibers are fabricated into test cells and the nitrogen flux determined to be about $0.7 \times 10^{-5}$ cm$^3$(STP)/cm$^2$ sec cmHg).

The flat sheet membranes of Examples 6-8 are evaluated as follows. The membranes are dried in a vacuum oven at room temperature for at least 24 hours. The membranes are then placed in an Amicon test cell on top of a macroporous support disk. The effective membrane area is about 12.5 cm$^2$ The membrane is first checked for leaks by filling the cell with water, pressurizing the cell to about 5 psi, and measuring any decay in pressure once the pressure source is cut off. The water is then emptied from the cell and the membrane dried. The nitrogen flux through the dry membrane is then measured. The membrane is then wetted with isopropyl alcohol, followed by water. The water flux through the membrane is then measured. The membrane is then again wetted with alcohol and dried prior to measuring the bubble point, mean pore size, and maximum pore size in accordance with ASTM F316-86.

EXAMPLE 6 Syndiotactic Polystyrene Flat Sheet Membrane Prepared From An Aprotic Solvent Syndiotactic polystyrene with a weight-average molecular weight of about $5.6 \times 10^5$ daltons is used to prepare a solution containing about 30.0% syndiotactic polystyrene and 70.0% o-dichlorobenzene. The mixture is dissolved by heating at about 176° C. for about 3 hours with repeated inversion of the vial containing the solution to ensure homogeneity.

The hot solution is cast between glass plates at about 157° C. The glass plates are quenched to room temperature. The film is extracted in isopropyl alcohol for about 4.5 hours after being removed from the glass plates. The film is dried under vacuum at room temperature for about 17.5 hours.

The nitrogen flux of the membrane at room temperature is about $$4.19 \times 10^{-3} \frac{cm^3 \ (STP)}{cm^2 \ sec \ cm \ Hg}.$$

EXAMPLE 7 Syndiotactic Polystyrene Flat Sheet Membrane Prepared From An Aprotic Solvent The syndiotactic polystyrene described in Example 6 is used to prepare a solution consisting of a mixture of about 30.0% syndiotactic polystyrene and about 70.0% nitrobenzene. The mixture is dissolved by heating at about 200° C. for about 3 hours with repeated inversion of the vial containing the solution to ensure homogeneity.

The hot solution is poured between two glass plates at about 158° C. The glass plates are quenched to room temperature. After removing the film from the plates, it is soaked in isopropyl alcohol at room temperature for about 3 hours. The film is dried under vacuum at room temperature overnight.

The membrane exhibits a nitrogen flux at room temperature of about $$3.75 \times 10^{-3} \frac{cm^3 \ (STP)}{cm^2 \ sec \ cm \ Hg}.$$

EXAMPLE 8 Syndiotactic Polystyrene Flat Sheet Membrane Prepared From An Aprotic Solvent A solution of about 30.0% of syndiotactic polystyrene with a molecular weight in excess of $3 \times 10^6$ daltons and about 70.0% o-dichlorobenzene is cast, quenched, extracted, and dried as described in Example 7.

The membrane characteristics are measured according to ASTM F316-86 and F317-86 and F317-72 (1982). The porosity is about 47.3%, the mean pore size is about 460 Angstroms, and the maximum pore size is about 500 Angstroms. The membrane exhibits a water flux of about 100.1 GFD at 50 psi.

What is claimed is:

1. A semi-permeable membrane comprising a thin isotropic syndiotactic polystyrene microporous membrane.

2. The membrane of claim 1 wherein the membrane is in hollow fiber form.

3. The membrane of claim 1 wherein the porosity is in the range of about 5 to about 90 percent.

4. The membrane of claim 3 wherein the membrane is useful for ultrafiltration, microfiltration, membrane distillation, membrane stripping, and/or as a support for a composite gas or liquid separation membrane.

5. The membrane of claim 4 wherein the mean pore size is in the range of about 5 to about 1000 Angstroms for ultrafiltration membranes and about 0.02 to about 10 microns for microfiltration, membrane distillation, and/or membrane stripping membranes.

6. The membrane of claim 5 wherein the membrane is useful for ultrafiltration and possesses a maximum pore size which exhibits a bubble point with denatured alcohol in the range of about 90–100 psig or greater.

7. The membrane of claim 5 wherein the gas flux for nitrogen is at least $$10^{-6} \frac{cm^3 \ (STP)}{cm^2 \ sec \ cm \ Hg}.$$

8. The membrane of claim 5 wherein the flux of water at 50 psig is at least about 1 GFD.

9. A process for preparing a semi-permeable isotropic syndiotactic polystyrene microporous membrane comprising the steps of;
   A. forming a mixture comprising;
      (i) syndiotactic polystyrene, and
      (ii) at least one solvent for the syndiotactic polystyrene;
   B. heating the mixture to a temperature under conditions such that a homogeneous fluid is formed which possesses sufficient viscosity to be formed into a membrane;
   C. extruding or casting the homogeneous fluid into a membrane;
   D. quenching or coagulating the membrane by passing the membrane through one or more zones under conditions such that the membrane solidifies; and
   E. simultaneously or consecutively leaching the membrane by passing the membrane through one or more zones under conditions such that at least a substantial portion of the solvent for the syndiotactic polystyrene is removed from the membrane;
wherein the semi-permeable membrane so formed possesses isotropic microporous structure.

10. A process for preparing a semi-permeable isotropic syndiotactic polystyrene microporous membrane comprising the steps of;
   A. forming a mixture comprising;
      (i) syndiotactic polystyrene,
      (ii) at least one solvent for the syndiotactic polystyrene, and
      (iii) at least one non-solvent for the syndiotactic polystyrene;
   B. heating the mixture to a temperature under conditions such that a homogeneous fluid is formed which possesses sufficient viscosity to be formed into a membrane;
   C. extruding or casting the homogeneous fluid into a membrane;
   D. quenching or coagulating the membrane by passing the membrane through one or more zones under conditions such that the membrane solidifies; and
   E. simultaneously or consecutively leaching the membrane by passing the membrane through one or more zones under conditions such that at least a substantial portion of the solvent and non-solvent for the syndiotactic polystyrene is removed from the membrane;
wherein the semi-permeable membrane so formed possesses isotropic microporous structure.

11. The process of claim 9 or 10 which further comprises;
   F. drawing the membrane before, during, and/or after leaching at a temperature at or above ambient temperature and below the melting point of the syndiotactic polystyrene or the depressed melting point of the mixture to elongate the membrane and to induce orientation of the syndiotactic polystyrene in the membrane.

12. The process of claim 11 wherein the amount of syndiotactic polystyrene in the mixture is between about 5 and about 90 weight percent.

13. The process of claim 12 wherein the homogeneous fluid is extruded or cast at a temperature of between about 25 and about 325° C.

14. The process of claim 13 wherein the membrane is quenched by passing the membrane through an air zone wherein the membrane begins to solidfy.

15. The process of claim 14 wherein the temperature of the air quench zone is between about 0 and about 100° C.

16. The process of claim 11 which further comprises:
   G. before or after leaching and/or drawing, the membrane is annealed by exposing the membrane to a temperature above the glass transition temperature of the syndiotactic polystyrene or the mixture and about 10° C. below the melting point of the syndiotactic polystyrene or the depressed melting point of the mixture for a period of time between about 30 seconds and about 24 hours.

17. The processing of claim 10 wherein the membrane is quenched by:
(i) passing the membrane through one or more liquid zones comprising a liquid which is a solvent for the syndiotactic polystyrene solvent and non-solvent and which is not a solvent for the syndiotactic polystyrene, wherein the membrane is solidified and a portion of the syndiotactic polystyrene solvent and non-solvent is removed; or
(ii) passing the membrane through one or more liquid zones comprising a liquid which is not a solvent for the syndiotactic polystyrene solvent and non-solvent and which is not a solvent fore the syndiotactic polystyrene, wherein the membrane is solidified.

18. The process of claim 17 wherein the temperature of the liquid quench zone(s) is between about 0 and about 100° C.

19. The process of claim 18 wherein the quench liquid is water, a lower alcohol, a halogenated hydrocarbon, or a perhalogenated carbon compound.

20. The process of claim 19 wherein the membrane is drawn at a temperature of between about 10 and about 280° C.

21. The process of claim 20 wherein the membrane is drawn to an elongation ratio of between about 1.05 and about 10.

* * * * *